Nov. 16, 1954 — C. F. KAEGEBEIN — 2,694,381
EGG COLLECTING AND RETAINING NEST
Filed May 2, 1952 — 2 Sheets-Sheet 1

CARL F. KAEGEBEIN
INVENTOR.

BY
Bean, Brooks, Buckley & Bean
ATTORNEYS

Nov. 16, 1954  C. F. KAEGEBEIN  2,694,381
EGG COLLECTING AND RETAINING NEST
Filed May 2, 1952  2 Sheets-Sheet 2
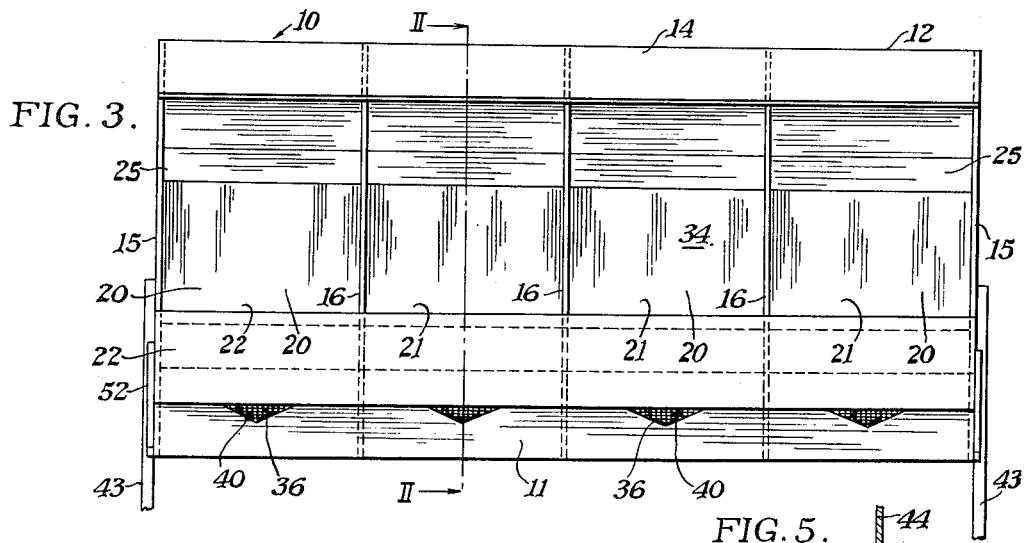
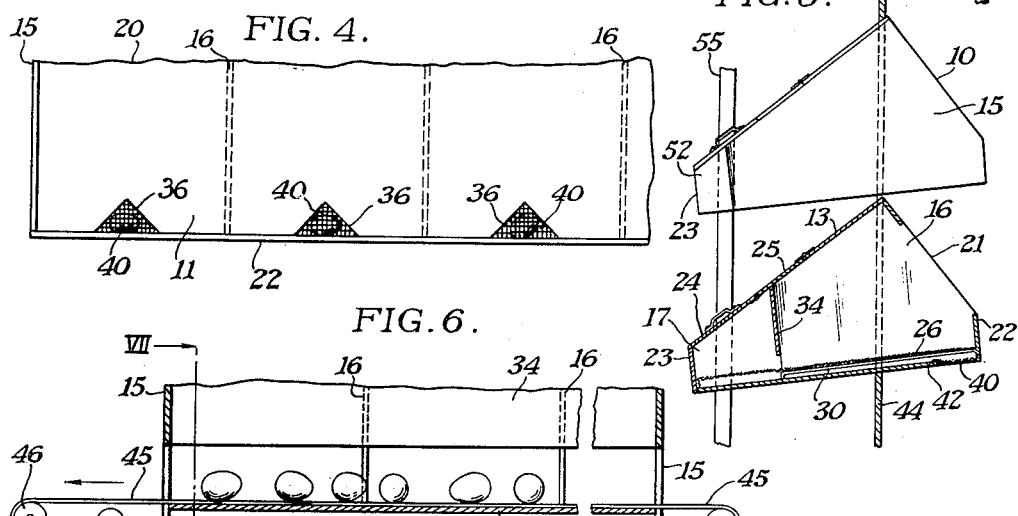
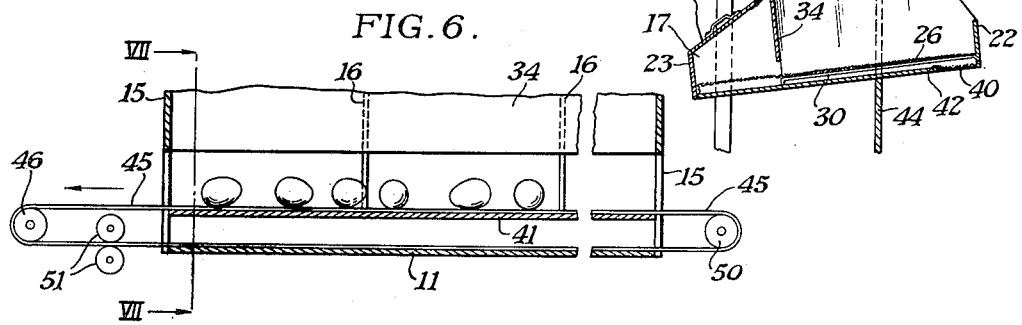
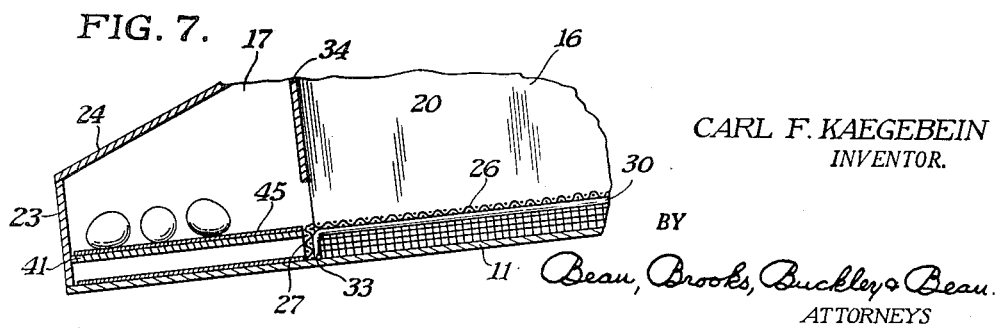
CARL F. KAEGEBEIN
INVENTOR.
BY
Bean, Brooks, Buckley & Bean.
ATTORNEYS 2,694,381
Patented Nov. 16, 1954

2,694,381

EGG COLLECTING AND RETAINING NEST

Carl F. Kaegebein, Grand Island, N. Y.

Application May 2, 1952, Serial No. 285,629

12 Claims. (Cl. 119—48)

My invention relates in general to laying nests for poultry.

The principal object of my invention is to provide a laying nest for poultry so designed as to encourage hens to deposit their eggs therein.

Another object is to provide a slooping ceiling so spaced from the bottom of the nest that the tail of the fowl will engage the ceiling and thereby urge the hen to a laying position within the nest.

Another object is to provide a nest having a wire mesh floor with turndown edges, whereby it will be resiliently supported above the bottom of the nest.

Another object is to provide a nest which is elevated above the ground and which has an artificial egg so located that it can be seen by the hen from a position beneath the nest, which encourages the hen to enter the nest.

A further object is to provide a laying nest having a laying stall and with a separate egg manger provision being made to automatically remove the eggs from the stall and deposit them in the manger, thereby making the device applicable to small or large flocks of birds.

Another object is to provide a device so designed that a number of them may be arranged in tiers or end-to-end.

Moreover, when arranged in end-to-end manner, a conveyor belt may be used to remove the eggs from the egg mangers.

Furthermore, my device is inexpensive to manufacture and may be easily knocked down for convenient storage or shipment.

The above objects and advantages have been accomplished by the device shown in the accompanying drawings, of which:

Fig. 3 is a front view of the device;

Fig. 4 is a fragmentary bottom view thereof;

Fig. 5 is an end elevation, partly in section and drawn to a reduced scale, showing a number of nests in tier arrangement;

Fig. 6 is a longitudinal sectional view showing a modification in which a conveyor belt is used for removing the eggs; and, Fig. 7 is an enlarged transverse sectional view taken on line VII—VII of Fig. 6.

Figure 1:
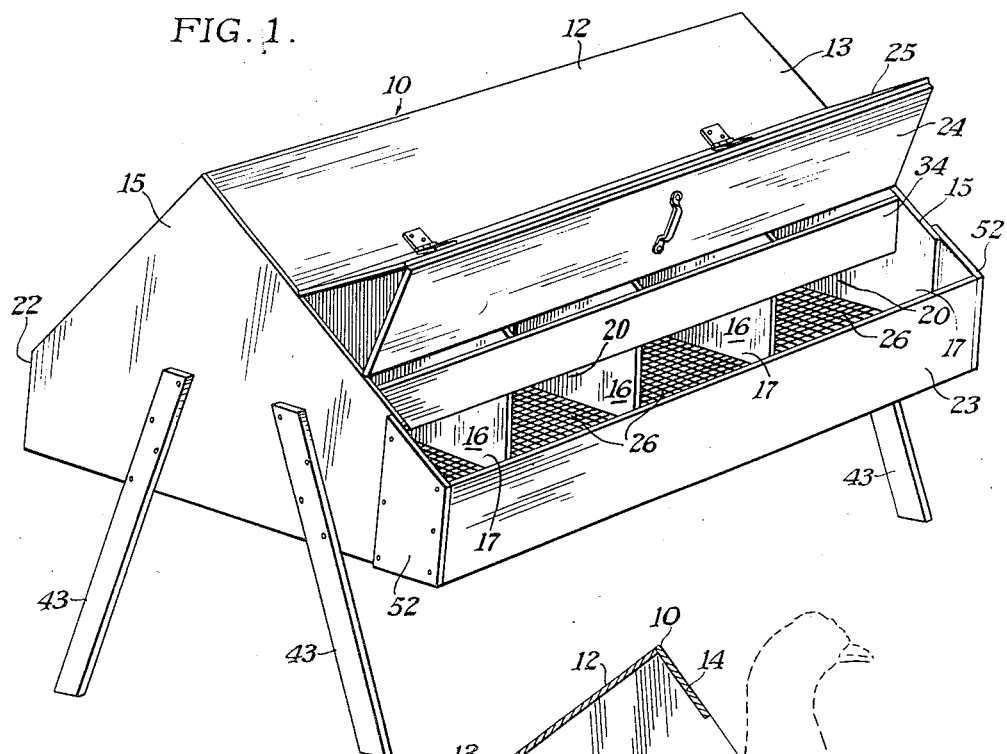
Fig. 1 is a perspective view showing the rear of the nest.

My device comprises a housing 10 having a rigid inclined bottom 11. The housing is provided with a gable ceiling 12 formed with an inclined rear portion 13 and preferably with an inclined front portion 14. End walls 15 are provided which have gable-shaped upper edge surfaces and which serve to connect the bottom of the housing with the ceiling. While my device may be formed with but one stall, it is preferable to form a number of stalls 20 in each housing by the use of a number of permanently arranged partitions 16. Arranged behind each stall is an egg gathering manger 17 in which the eggs are collected. An opening is formed across the front of the housing thereby providing an entrance opening 21 for each stall. A front wall 22 is arranged at the front side of the housing and serves to define the lower edge of the entrance opening 21, the upper edge of the opening being defined by the lower edge of the inclined portion 14 of the ceiling. The rear portion of the ceiling is inclined downwardly and it extends from the peak of the gable down to a back wall 23. The rear portion of the ceiling is provided with hinged members 24 and 25, which may be opened, as shown in Fig. 1, to uncover the egg gathering manger and to permit access to the interior of the housing.

Figure 2:
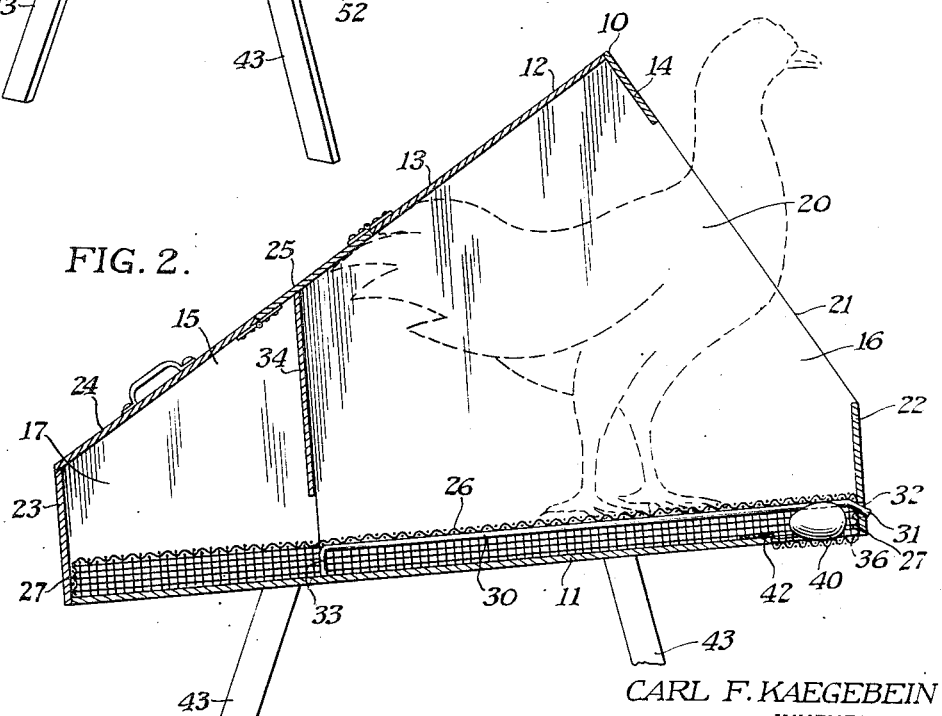
Fig. 2 is an enlarged transverse sectional view taken on line II—II of Fig. 3.

As clearly shown in Fig. 2, it will be seen that the front wall 22 extends upwardly from the bottom and that the upper edge thereof is positioned forwardly of the lower edge of the front portion 14 of the ceiling, whereby the front wall acts as a perch and makes it necessary for the bird to alight thereon before entering the stall thereby initially placing her partially within the stall or nesting compartment. This construction provides a partially open nest readily accessible to the birds even when the nest is placed with its entrance side against a wall. In such position it will be evident from Fig. 2 that the effective size of the opening when approached from above in a vertical plane is not restricted. The opening can never be closed no matter in what position the nest is placed, and the size of the opening is never less than the distance between vertical planes passing through the lower edge of the front portion 14 of the ceiling and the upper edge of the front wall 22.

A removable wire mesh floor 26 is provided for each of the stalls and each floor extends preferably from the front wall 22 to the back wall 23 and into the egg gathering manger. Each inclined wire floor is so positioned that the vertical distance between it and the rear portion of the inclined ceiling is less than the normal distance between the tip of a hen's tail and the floor. Each of these floor members has its edges turned down so as to provide flanges 27 to hold the top surface of the floor in spaced relation with the bottom 11 of the nest and to give some resiliency to the floor. In order to strengthen the floor and to permit a limited amount of flexing, I provide a reinforcing rod 30 which extends longitudinally of the floor near the center thereof. This rod has its forward end 31 bent at an angle and disposed within an aperture 32 formed in the front wall, and its rear end 33 is turned downwardly at substantially a right angle and is supported by the bottom 11. A separator wall 34 extends across the stalls at the rear thereof and serves to divide each of the hen stalls from the egg manger 17. This separator wall, which extends from one end wall to the other, is preferably secured to the rear edges of the partitions 16, and has its lower edge spaced above the floor 11 whereby eggs rolling down the inclined floor are allowed to pass under the separator wall and be deposited in the manger. Movement of the hen on the floor after the egg is laid causes some vibration of the floor which aids in the movement of the egg. The eggs are, therefore, removed from the stalls and are collected in the egg manger very soon after being laid, thus preventing their being broken or eaten and at the same time obviates the necessity of subsequent cleaning. When it is desired to collect the eggs, it is only necessary to lift the hinged members 24 and 25 of the rear ceiling portion to gain access to the manger. Should an egg remain in one of the stalls, it may be removed through an inspection slot formed between the upper edge of the separator wall 34 and the lower edge of the hinge member 24 when the hinge members 24 and 25 are opened as shown in Fig. 1. This inspection slot is formed at the egg collecting side of the device which makes it possible to make a thorough inspection of the laying stalls.

The bottom 11 of the housing is formed with a number of clean-out openings 36. One of these openings is provided for each stall and it is located near the center of the stall and adjacent the front wall 22. These openings are preferably V-shaped, as shown in Fig. 4, and each is covered by means of a wire screen 40. Each of these screens is preferably let into the opening so as to form a pocket for the reception of a decoy egg. The pocket extends below the lower surface of the bottom, and is formed with suitable edge flanges 42 for support by the bottom 11. The decoy egg is, therefore, visible to the hen from beneath the nest as well as from the open front of the nest when she is perched upon the edge of the front wall.

Suitable supporting legs 43 are provided for the nest and these may be removably secured to the end walls 15 of the housing. When it is desired to mount the nest in a wall or partition of a hen house or barn, the legs are, of course, omitted or removed and the housings 10 are positioned so that their front portions project through the wall 44 shown in Fig. 5. Two or more of the housings may be placed in this position, if desired. When in this position, it will be observed that the back of the nest projects into a separate room which may be heated to maintain the eggs in the egg mangers at proper temperature, which is desirable particularly with eggs to be used for hatching. When the nests are arranged in tiers, as shown in Fig. 5, a vertical brace 55 is preferably employed to support the overhanging ends of the nests. Obviously, when the housings are to be arranged end-to-end, they may be supported by the leg structure shown in the drawing. When arranged in this manner, it is desirable to remove the eggs from all of the egg mangers by means of a conveyor belt 45, such as that shown in Figs. 6 and 7. When a belt is to be used, a support 41 is extended across each manger to maintain the upper surface of the belt flush with the top surface of the floors 26, each floor being cut away to accommodate the support. The belt passes over the top of the supports 41 and carries the eggs disposed in the mangers along with it to any suitable place of discharge. The belt passes around suitable idlers 46 and 50 positioned outside of the group of nests and driven preferably by means of drive rollers 51. The under pass of the belt returns along the bottom 11 and the turndown flanges 27 of the floors are cut away to provide suitable clearance for the belt. In order that a conveyor belt may be used and extended through the housing, I provide each of the end walls 15 with a detachable plate 52 which may be removed to accommodate the belt.

From the foregoing, it will be clear that a hen desiring to enter the nest will alight upon the perch formed by the front wall 22 which places her partly within the nest and from which position she will see the decoy egg and be induced to enter the stall. After hopping into the stall, the hen will turn around facing the entrance opening and as she does so, her tail will contact the rear portion of the sloping ceiling prompting her to assume a laying position. The eggs laid on the stalls will roll down the floor, pass under the separator wall, and into the egg manger. As the hen moves around upon the inclined floor, the resiliency thereof will cause some vibration of the floor which will accelerate the rolling tendency of the eggs. The hen stalls will, therefore, be free of eggs at substantially all times so that the nests can be repeatedly used by many different hens. Furthermore, hens walking around under the nests, see the artificial egg supported by the screen 40 covering the cleanout opening and are induced to enter the nest to lay their eggs. If the poultry man discovers that his hens prefer litter upon which to lay their eggs, it is a simple matter to scatter litter on the floors or to fill the space between the floor and bottom with litter. In cases where the hens react against the wire mesh floors, they may be removed entirely until the birds have been trained to use them.

If desired, each of the narrow stalls may be covered at the front by means of conventional curtains (not shown) suspended from the front portion 14 of the ceiling. In order to keep the hens from perching on the gable of the nest, I may provide a conventional anti-roost reel (not shown) secured to and extending the full length of the housing. These and other modifications may be made without departing from the spirit of my invention or the scope of the appended claims; and, I do not therefore wish to be limited to the details herein shown and described.

What I claim is:

1. A hen nest comprising an enclosure having a hen opening on one side and an egg opening on the other side, an inclined floor and an inclined ceiling, the vertical distance between said floor and an intermediate point in said ceiling being less than the normal distance between the tip of a hen's tail and the floor on which she stands.

2. The invention according to claim 1 with a front wall extending across the enclosure and forming a perch.

3. The invention according to claim 1 with an inclined bottom, a front wall extending upwardly therefrom, and a wire mesh floor supported by said bottom.

4. The invention according to claim 1 with a ceiling having an inclined back portion and an oppositely inclined front portion, said front portion extending only part way down the front of the enclosure thereby forming the upper boundary of the hen opening.

5. The invention according to claim 1 with an inclined bottom, a front wall extending upwardly therefrom and forming the lower boundary of the hen opening, the ceiling being formed with an inclined back portion and an oppositely inclined front portion, said front portion extending only part way down the enclosure and forming the lower boundary of the hen opening.

6. The invention according to claim 1 with laterally arranged vertical walls forming stalls.

7. The invention according to claim 1 with an egg manger in communication with the egg opening of the nest.

8. A hen nest comprising an enclosure having a hen opening at one side and an egg opening at the opposite side, an inclined floor and a ceiling having an inclined back portion and an oppositely inclined front portion, said front portion extending only part way down the front of the enclosure and bounding the upper edge of the hen opening, a front wall extending upward from the bottom of said enclosure and bounding the lower edge of the hen opening, the upper edge of the hen opening being spaced rearwardly from a vertical plane passing through the lower edge thereof, whereby the hen opening will be accessible when the nest is placed against a vertical wall.

9. A hen nest comprising an inclined floor, side walls and a front wall extending upwardly a short distance above said floor, a rearwardly and downwardly inclined ceiling on said side walls extending from a point rearwardly of the vertical plane of said front wall, a rear wall extending downwardly from said ceiling to a point spaced from said floor, the distance from said floor to a point intermediate the front and rear of said ceiling being less than the normal distance from the tip of a hen's tail to the floor on which she stands.

10. A hen nest comprising an inclined floor, side walls, and a front wall extending upwardly a short distance above said floor, a ceiling having a rearwardly and downwardly inclined portion and an oppositely inclined front portion, the front portion extending only part way down the front of the nest, the lower edge of said front portion extending from a point rearwardly of the vertical plane of said front wall, and forming therebetween a hen opening, the distance from said floor to a point intermediate the front and rear of said rear ceiling portion being less than the normal distance from the tip of a hen's tail to the floor on which she stands.

11. The invention according to claim 10 with a separator wall extending downwardly from said rear inclined ceiling portion having its lower edge spaced from said floor, thereby forming an egg manger.

12. The invention according to claim 1 with a closure member hinged at its upper edge to the inclined back portion for exposing said back of the interior of the nest.

References Cited in the file of this patent

UNITED STATES PATENTS

| Number | Name | Date |
|---|---|---|
| 2,501,475 | Muehlfeld | Mar. 21, 1950 |
| 2,531,584 | Peterson | Nov. 28, 1950 |
| 2,584,909 | Ockenfels | Feb. 5, 1952 |
| 2,589,228 | Cordis | Mar. 18, 1952 |
| 2,617,384 | Tjaden et al. | Nov. 11, 1952 |